US007228428B2

(12) United States Patent
Cousins et al.

(10) Patent No.: US 7,228,428 B2
(45) Date of Patent: Jun. 5, 2007

(54) METHOD AND APPARATUS FOR EMBEDDING ENCRYPTED IMAGES OF SIGNATURES AND OTHER DATA ON CHECKS

(75) Inventors: Steve B. Cousins, Cupertino, CA (US); Jeff Breidenbach, Mountain View, CA (US); Rangaswamy Jagannathan, Sunnyvale, CA (US)

(73) Assignee: Xerox Corporation, Stamford, CT (US)

( * ) Notice: Subject to any disclaimer, the term of this patent is extended or adjusted under 35 U.S.C. 154(b) by 654 days.

(21) Appl. No.: 10/014,486

(22) Filed: Dec. 14, 2001

(65) Prior Publication Data

US 2003/0115470 A1 Jun. 19, 2003

(51) Int. Cl.
*G06K 9/00* (2006.01)

(52) U.S. Cl. ...................... 713/179; 382/100; 382/137; 382/151; 382/216; 726/2; 726/26

(58) Field of Classification Search .................. 380/51, 380/54–55, 252; 235/462.25, 462.15, 454, 235/462.01, 462.09–462.11, 487, 462.1; 382/161, 166, 183, 232, 306, 309, 310, 317, 382/100, 181, 197, 137, 151, 216; 713/176, 713/179, 168, 199; 345/102, 440; 356/71; 359/362; 726/2, 26
See application file for complete search history.

(56) References Cited

U.S. PATENT DOCUMENTS 3,796,497 A * 3/1974 Mathisen et al. ...... 356/139.07
4,202,626 A * 5/1980 Mayer et al. ................. 356/71
4,637,634 A 1/1987 Troy et al. ..................... 283/98
5,337,362 A * 8/1994 Gormish et al. .............. 380/54
5,490,217 A * 2/1996 Wang et al. .................. 380/51
5,505,494 A 4/1996 Belluci et al. ................ 283/75
5,513,264 A * 4/1996 Wang et al. .................. 380/51
5,557,690 A * 9/1996 O'Gorman et al. ......... 382/151
5,793,031 A * 8/1998 Tani et al. ............. 235/462.15
5,825,933 A 10/1998 Hecht ......................... 382/243
5,832,089 A 11/1998 Kravitz et al.
5,841,886 A 11/1998 Rhoads ....................... 382/115

(Continued)

FOREIGN PATENT DOCUMENTS

EP 0 511 824 A2 11/1992

(Continued)

OTHER PUBLICATIONS

Herve Gallaire, "The Future of the Document," Xerox Research and Technology, p. 1-5.

(Continued)

*Primary Examiner*—Kim Vu
*Assistant Examiner*—Yin-Chen Shaw

(57) ABSTRACT

Apparatus, methods, and articles of manufacture consistent with the present invention provide a check validation scheme wherein a payor's signature is digitized, encrypted and embedded on the front of the check using glyphs. When the payor seeks to convert a blank check into a negotiable instrument, the user fills out the check and signs it. When the check is presented to a bank for payment, a teller using a decoding device, decodes and decrypts the digitized signature such that a human-readable image of the digitized signature can be seen on a screen for comparison with the payor's scripted signature. If the two signatures are identical, the check is honored.

14 Claims, 10 Drawing Sheets

U.S. PATENT DOCUMENTS

| | | | | |
|---|---|---|---|---|
| 5,850,442 | A | 12/1998 | Muftic | |
| 5,850,481 | A * | 12/1998 | Rhoads | 382/232 |
| 5,913,542 | A | 6/1999 | Belucci et al. | 283/75 |
| 5,943,423 | A | 8/1999 | Muftic | |
| 5,974,150 | A * | 10/1999 | Kaish et al. | 713/179 |
| 6,201,879 | B1 * | 3/2001 | Bender et al. | 382/100 |
| 6,201,901 | B1 * | 3/2001 | Zhou et al. | 382/306 |
| 6,292,092 | B1 | 9/2001 | Chow et al. | 340/5.6 |
| 6,459,821 | B1 * | 10/2002 | Cullen | 382/294 |
| 6,470,099 | B1 * | 10/2002 | Dowdy et al. | 382/287 |
| 6,614,914 | B1 * | 9/2003 | Rhoads et al. | 382/100 |
| 6,634,559 | B2 * | 10/2003 | Shioda et al. | 235/487 |
| 6,869,015 | B2 * | 3/2005 | Cummings et al. | 235/462.25 |
| 2002/0056041 | A1 * | 5/2002 | Moskowitz | 713/176 |
| 2002/0179717 | A1 * | 12/2002 | Cummings et al | 235/462.25 |
| 2003/0025667 | A1 * | 2/2003 | Yerazunis et al. | 345/102 |

FOREIGN PATENT DOCUMENTS

EP 0 805 409 A2 11/1997

OTHER PUBLICATIONS

European Search Report for EPO counterpart Application No. EP 02 02 7932 dated Jun. 1, 2004.

* cited by examiner

METHOD AND APPARATUS FOR EMBEDDING ENCRYPTED IMAGES OF SIGNATURES AND OTHER DATA ON CHECKS

BACKGROUND OF THE INVENTION

Negotiable transactions typically involve the following parties: a payor, a payee, and a corresponding financial institution such as a bank or other type of intermediary such as a clearing-house. A negotiable document or instrument issued as a form of payment, for instance a check, is used by the financial institution to transfer funds between accounts, typically to credit the payee's account and debit the payor's account. Information about all parties involved in the transaction is contained in the negotiable document.

Traditionally, the payor's handwritten signature has been used as an indicia of the authenticity of the document and the information contained therein. The underlying reasons for this include: (1) a signature is assumed to be difficult to forge, thereby serving as proof that the signor is cognizant of and in agreement with the contents of the document, particularly the amount and identity of the payee; (2) a signature is assumed to be non-reusable—it is thought of as being an integral or inseparable part of the document and cannot easily be transferred to, or reproduced onto, another document; (3) once signed, it is assumed that the document cannot be modified or altered; and (4) it is generally assumed that the signature cannot be repudiated. In reality, these assumptions are generally false. Unless a financial clerk has access to a large and extremely fast graphical database of payor signatures, it is very difficult for the clerk to reliably detect forged signatures when processing checks. Nor have electronic systems progressed to the point where they can accurately or consistently identify forged signatures. Even if a signature is authentic, it is not very difficult to alter documents after being signed, particularly the monetary value of the document or the identity of the payee. Moreover, the entire check may be fraudulently produced such that no alterations or additions to the negotiable document may be readily discerned.

Check fraud has been considered to be the third largest type of banking fraud, estimated to be about fifty million dollars per year in Canada according to a KPMG Fraud Survey Report. In the United States, such fraud is estimated to cause financial loss of over ten billion dollars per year. Financial institutions and corporations spend a great deal of time, effort and money in preventing or recovering from fraudulent checks. With the recent proliferation and affordability of computer hardware such as document scanners, magnetic-ink laser printers, etc., check fraud is expected to reach new limits.

To date, various attempts have been made to protect checks from fraudulent interference of the type described above. One method is to use mechanical amount-encoding machines which create perforations in the document reflecting the monetary value thereof. The perforations in the document define the profile of an associated character or digit. However, a check forger can still scan the payor's signature and reprint the check with a new amount using the same type of readily available mechanical encoding machine to apply the perforations. This method also has a significant drawback due to the amount of time and human labor required to produce checks, and thus may be considered expensive or impractical for certain organizations.

Another prior art check protection method uses electronic means to print the numerical amount of the check using special fonts, supposedly difficult to reproduce. A negotiable document is considered unforged if it contains the special font and if the characters representing the monetary value of the check are not tampered with. Due to the fact that these characters are difficult to produce without a machine or a computer, the check is assumed to be protected. Given the ready availability of high quality scanners and printers, it is, however, possible that the check forger will copy one of the characters printed on the check and paste it as the most significant digit of the amount thereby increasing the monetary amount of the transaction. As such, after the forger reprints the check with a new most significant digit, the check will meet the criteria of having the special fonts defining the numerical amount, whereby the forged document may be interpreted as a valid check.

Other types of check validation techniques are disclosed in U.S. Pat. No. 4,637,634 to Troy et al. This reference discloses a sales promotional check which consists of a top check half, distributed through direct mail, flyers, newspaper inserts, etc., and a bottom check half which may be obtained, for example, when a stipulated purchase of goods or services has been made by the intended payee. If information on the top and bottom halves match, the check becomes a negotiable instrument. For validation purposes, the bottom half is provided with at least one code number that is generated, using a complex mathematical formula, from the check number, the register number, and the script dollar amount, all of which are present on the face of the check in human-readable form. The validation code number appears as a bar code or other machine readable code on the face of the check. For verification purposes, the same code number appears underneath an opaque "rub-off" overlay which, if tampered with, renders the check void. To verify the check, the opaque overlay is removed to reveal the concealed code number which is then compared against the machine readable code number printed on the check. This system is still prone to tampering because one could alter the amount of the check without tampering with the code numbers. To avoid this situation, the check must be compared against a predefined list, i.e. an electronic file, listing all of the payor's checks to verify the original amount. Thus, this system may therefore be impractical for most organizations and is incompatible with current check clearing procedures.

There remains a need for securing information associated with negotiable documents from being fraudulently tampered with. Moreover, there remains a need for such a security system which is compatible with current check printing systems and check clearing systems, and which generates checks that are essentially unforgeable.

SUMMARY OF THE INVENTION

Apparatus, methods, and articles of manufacture consistent with the present invention provide a check validation scheme wherein a payor's signature is digitized, encrypted and embedded on the front of the check using glyphs. Later, when the payor seeks to convert a blank check into a negotiable instrument, he/she fills out the check and signs it. When the check is presented for payment, a clerk using a decoding device, decodes and decrypts the digitized signature such that a human-readable image of the digitized signature can be seen on a screen for comparison with the payor's scripted signature. If the two signatures are identical, the check is honored.

Apparatus, methods, and articles of manufacture consistent with a second embodiment of the present invention provides a check validation scheme wherein the payor's signature, payee, amount, date, magnetic ink character recognition (MICR) line and memo is digitized, encrypted and embedded on the front of the check using glyphs when the check is created. When the check is presented to a bank for payment, a teller using a decoding device, decodes and decrypts the digitized information such that a human-readable image of the payee, amount and payor signature can be seen on a screen for comparison with the scripted information on the face of the check. If the information is identical, the check is honored.

Additional objects and advantages of the invention will be set forth in part in the description which follows, and in part will be clear from the description or will be learned by practice of the invention. The objects and advantages of the invention will be realized and attained by means of the elements and combinations particularly pointed out in the appended claims. It is understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and, together with the description, serve to explain the principles of the invention.

DETAILED DESCRIPTION OF THE INVENTION

Reference will now be made in detail to embodiments of the invention, examples of which are illustrated in the accompanying drawings. Apparatus, methods, and articles of manufacture consistent with the present invention provide a check validation scheme wherein a payor's signature is digitized, encrypted and embedded on the front of the check using glyphs.

Figure 1:
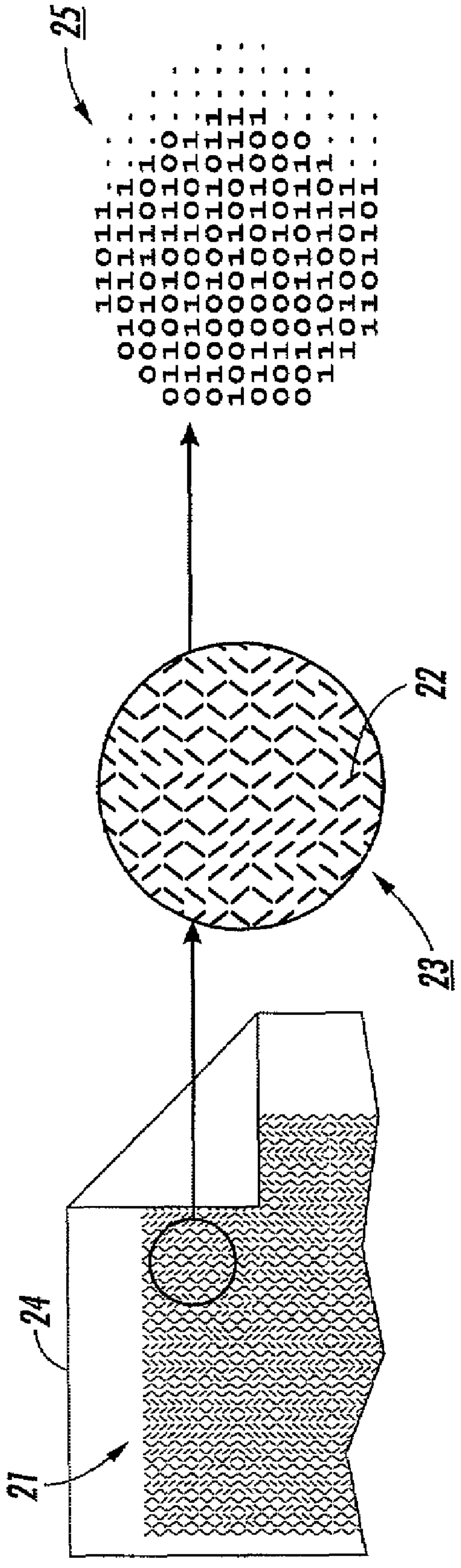
FIG. 1 illustrates an overview of the properties of glyph marks and codes embodied in the glyph marks.

FIG. 1 illustrates glyph marks and codes embodied in the glyph marks. Glyph marks are typically implemented as a fine pattern on a substrate, such as glyph marks 21 on substrate 24. Glyph marks are not easily resolved by the unaided human eye. Thus, glyph marks typically appear to the unaided eye as having a uniform gray scale appearance or texture, as illustrated by glyph marks 21 in FIG. 1.

Enlarged area 23 shows an area of glyph marks 21. Glyph marks 21 are comprised of elongated slash-like marks, such as glyph 22, and are typically distributed evenly widthwise and lengthwise on a lattice of glyph center points to form a rectangular pattern of glyphs. Glyphs are usually tilted backward or forward, representing the binary values of "0" or "1," respectively. For example, glyphs may be tilted at +45° or −45° with respect to the longitudinal dimension of substrate 24. Using these binary properties, the glyph marks can be used to create a series of glyph marks representing 0's and 1's embodying a particular coding system.

The glyph marks of enlarged area 23 can be read by an image capture device. The captured image of glyph marks can then be decoded into 0's and 1's by a decoding device. Decoding the glyphs into 0's and 1's creates a glyph code pattern 25. The 0's and 1's of glyph code pattern 25 can be further decoded in accordance with the particular coding system used to create glyph marks 21. Additional processing might be necessary in the decoding stage to resolve ambiguities created by distorted or erased glyphs.

Glyph marks can be implemented in many ways. Apparatus and methods consistent with the invention read and decode various types of glyph code implementations. For example, glyphs can be combined with graphics or may be used as halftones for creating images.

Figure 2:
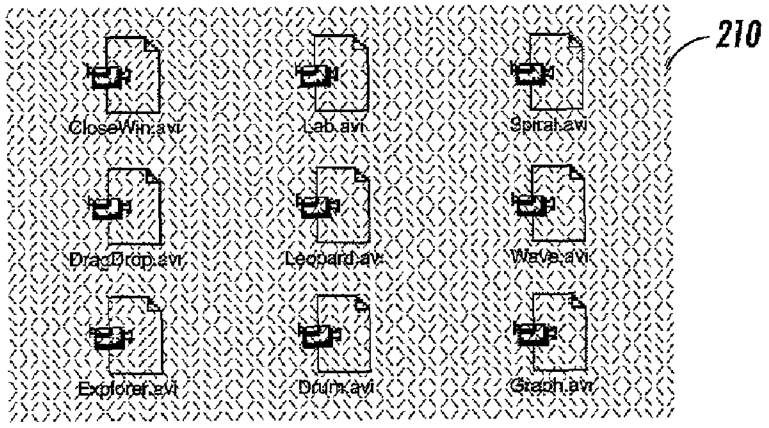
FIG. 2 illustrates an embodiment of an image combining graphics and glyphs consistent with the present invention.

FIG. 2 illustrates an embodiment of an image 210 combining graphics and glyphs consistent with the present invention. In this particular embodiment, the graphics comprise user interface icons. Each icon comprises a graphic overlaid on glyphs. The glyphs form an address carpet. The glyph address carpet establishes a unique address space of positions and orientations for the image by appropriate coding of the glyph values.

Figure 3:
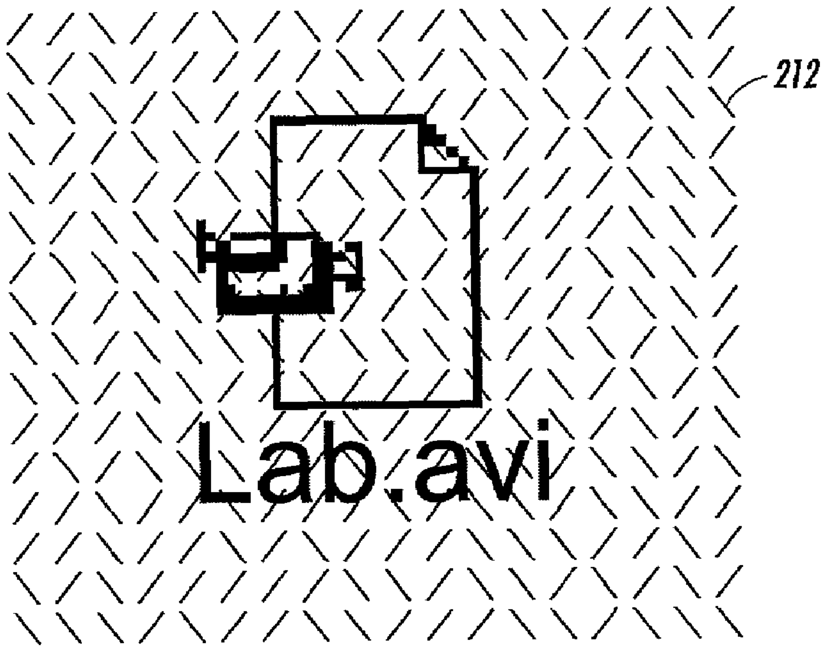
FIG. 3 illustrates an enlarged view of a portion of the image illustrated in FIG. 2.

FIG. 3 illustrates an enlarged view of a portion of image 210 illustrated in FIG. 2. More particularly, portion 212 illustrates the Lab.avi icon overlaying a portion of the address carpet, which unambiguously identifies the icon location and orientation.

Figure 4:
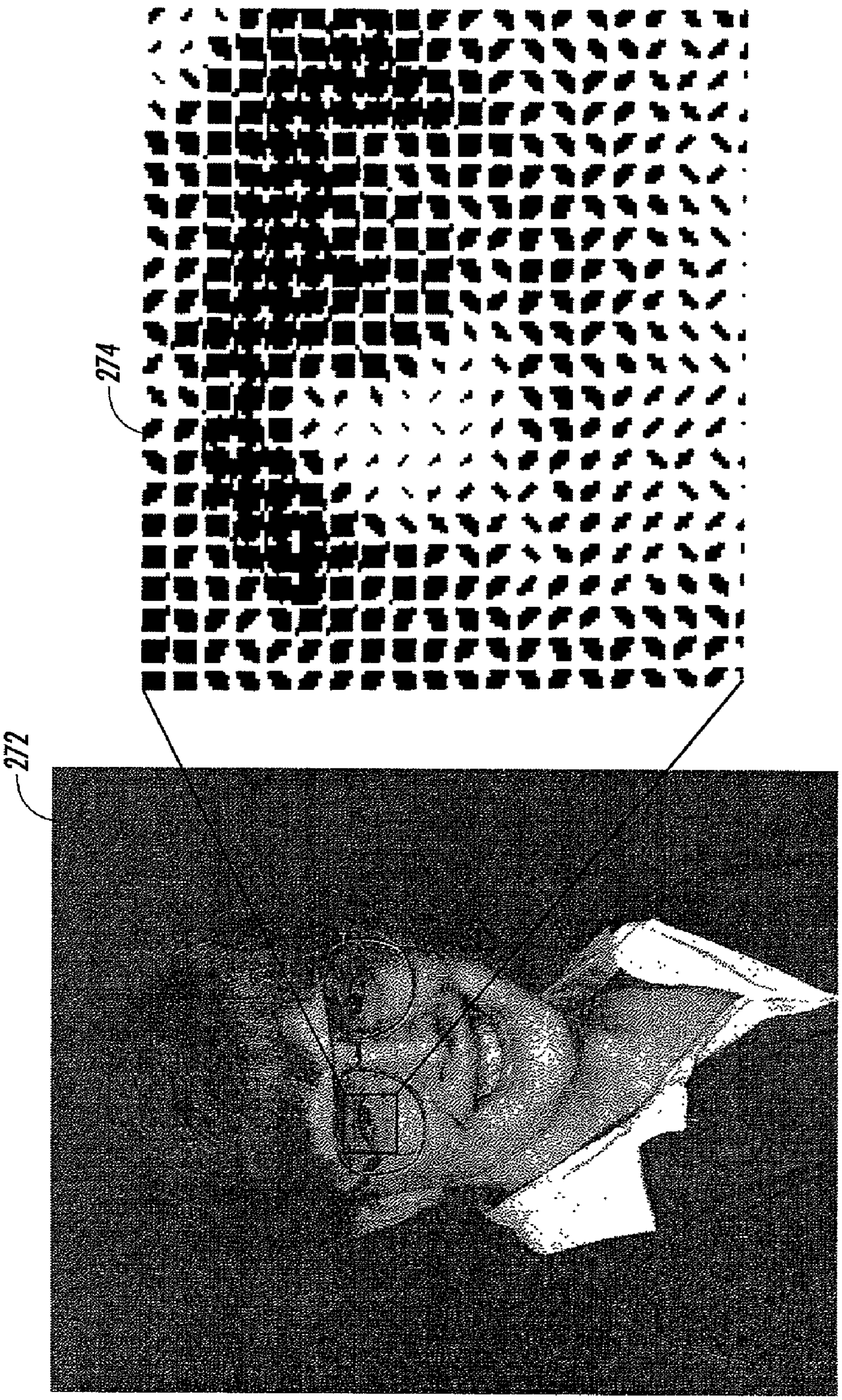
FIG. 4 illustrates an image of a pictorial comprising glyphtones consistent with the principles of the present invention.

FIG. 4 illustrates an image of a pictorial comprising glyphtones consistent with the present invention. Glyphtones are halftone cells having area-modulated glyphs that can be used to create halftone images incorporating a glyph code. As shown in FIGS. 1–4, glyphs and glyphtones allow a user to discretely embed machine-readable data in any pictorial or graphical image. Using glyphtones to encode the user-inputted information is included for illustrative purposes. Barcodes and other machine-readable codes, including 1D-barcodes, 2D barcodes adhering to the PDF417 standard, or other 2D symbologies, may also be used without departing from the spirit and scope of the present invention.

Figure 5:
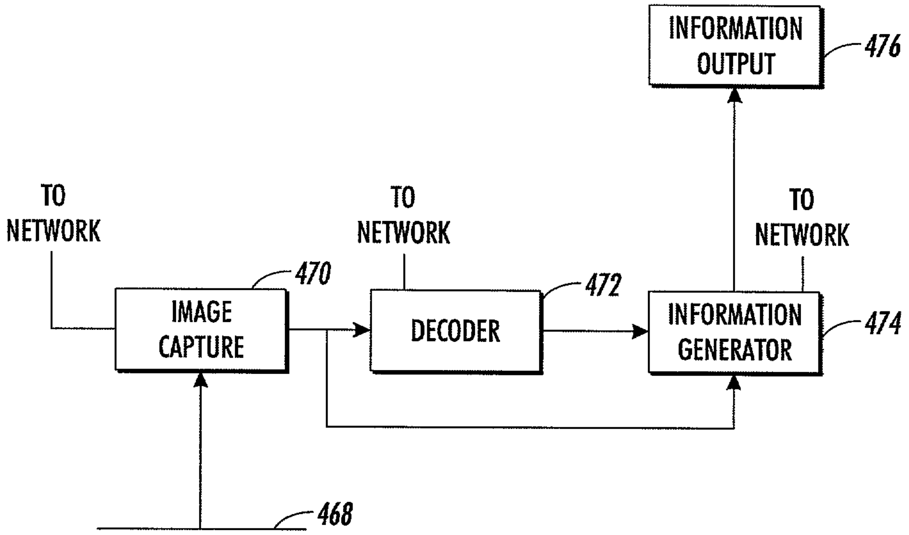
FIG. 5 illustrates a system for reading an image having embedded data, decoding the embedded data in the image, and developing human-sensible information based on the decoded embedded data.

FIG. 5 illustrates a system 500 for reading an image having embedded data, decoding the embedded data in the image, and developing human-sensible information based on the decoded embedded data. As shown, system 500 is comprised of image capture device 470, decoder 472, information generator 474 and information output 476. In operation, image capture 470 reads substrate 468 to capture an image having embedded data. In one embodiment, image capture device 470 is capable of scanning substrate 468 using two different resolutions: a low-resolution color scan of the substrate for display purposes; and a high-resolution monochrome scan of the DataGlyph region to maximize the accuracy of the captured data. Decoder 472 processes the high-resolution image, extracts data from the DataGlyph, and decodes the embedded data in the captured image. Information generator 474 develops human-sensible information based on the decoded embedded data, and outputs the information to information output 476, which represents one or more information output devices. Information generator 474 may additionally scale rendered output information to a resolution appropriate for output 476. The human-sensible information may be visual information decoded from the surface of substrate 468 (e.g., handwritten signature, amount, date, payee, payor, MICR line etc.) and additionally or alternatively may comprise tactile, audible, or other human-sensible information.

Figure 6:
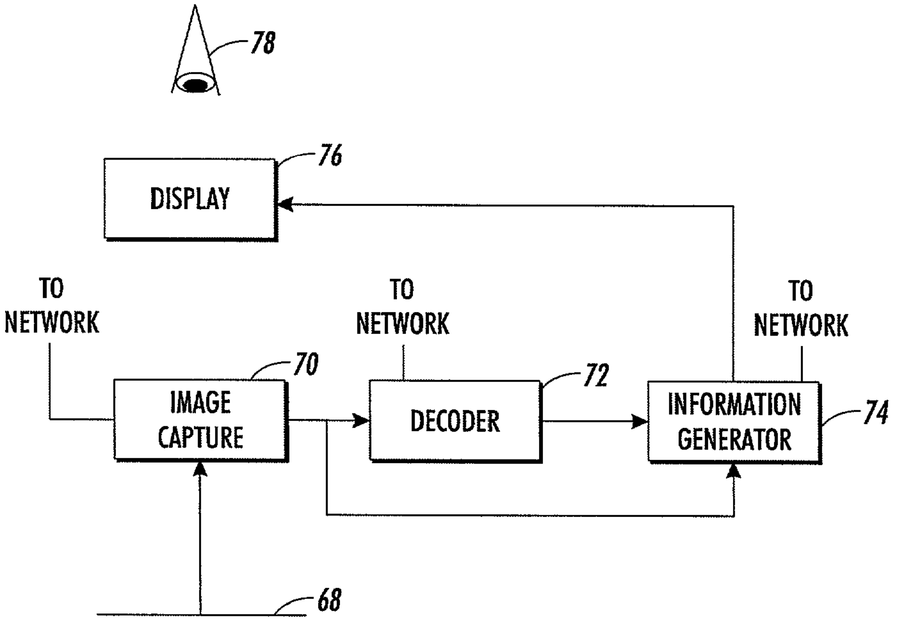
FIG. 6 illustrates a logical configuration of elements consistent with principles of the present invention.

FIG. 6 is a block diagram illustrating a logical configuration of elements in accordance with principles consistent with the invention. An image capture device 70 captures an image from a substrate 68. Substrate 68 has embedded data, such as glyphs embodied thereon. Image capture device 70 transfers the captured substrate image to a decoder 72 and an image generator 74. In one embodiment, substrate 68 is a personal check. In the present invention, a personal check may either be a handwritten or computer-generated check with embedded data. The embedded data on substrate 68 comprises a digitized image of any combination of the following: payor's signature, payee, amount, date, MICR line and memo. Decoder 72 analyzes the embedded data in the captured substrate image to decode the encrypted digital information. These results are transferred to image generator 74 for further processing. Image generator 74 processes the results from decoder 72 and the captured substrate image from image capture device 70. In one embodiment, image generator 74 retrieves an image of substrate 68 that is the same size as the footprint of display 76 and corresponds to the area of substrate 68 directly under the footprint of display 76. Because display 76 is aligned with substrate 68, observer 78 looking at display 76 is given the illusion of looking directly onto substrate 68. Image generator 74 may also add information to the image, or alter the retrieved image before sending it to display 76.

The image sent to display 76 may be generated by image generator 74 in many ways. For example, image generator 74 may merely pass on the image captured by image capture 70, or a representation of the image captured by image capture 70. A bitmap representation of the entire substrate 68 could be stored locally in image generator 74 or on a remote device, such as a device on a network. In one embodiment, in response to receiving codes from decoder 72, image generator 74 retrieves an area corresponding to the codes from the bitmap representation, and forwards the area representation to display 76 for display to a user. The area representation retrieved by image generator 74 may be the same size as the image captured by image capture 70, or may be an extended view, including not only a representation of the captured area, but also a representation of an area outside the captured area. The extended view approach only requires image capture 70 to be as large as is necessary to capture an image from substrate 68 that is large enough for the codes to be derived, yet still provides a perception to the user of seeing a larger area.

Figure 7:
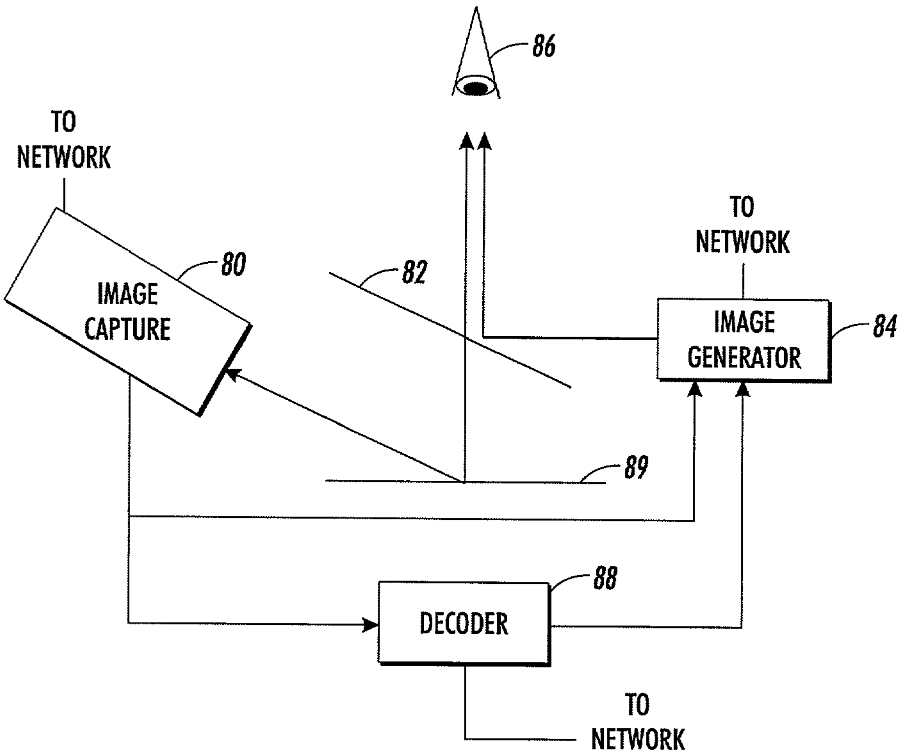
FIG. 7 illustrates another embodiment of a system consistent with the principles of the invention.

FIG. 7 is a block diagram illustrating an embodiment of a system consistent with the principles of the invention. A substrate 89 having embedded data thereon is positioned below a semitransparent mirror 82. An image from substrate 89 is captured by an image capture device 80. Image capture device 80 sends the captured image to a decoder 88, which decodes the image and determines codes from the captured image. Decoder 88 sends the codes to an image generator 84. Image generator 84 processes the codes, creates and/or retrieves image information based on the codes, and sends the image information to semitransparent mirror 82.

An observer 86 looking down onto semitransparent mirror 82 sees the image generated by image generator 84 overlaid on the image from substrate 89. In this way, the overlaid information can be dynamically updated and registered with information on substrate 89 based on the decoded image captured by image capture device 80. In an alternative embodiment, image capture 80 receives the substrate image reflected from semitransparent mirror 82.

In each of the systems of FIG. 5, FIG. 6 and FIG. 7, the elements may send information to and receive information from network devices. This allows the elements to interact with devices on a network. For example, programs and data may be sent to the elements from network devices, and the devices may send information to the devices on networks. While these figures all depict the use of a network to communicate information, it is important to realize that the information may instead be resident on a standalone computer and therefore not rely on a network to operate.

Figure 8:
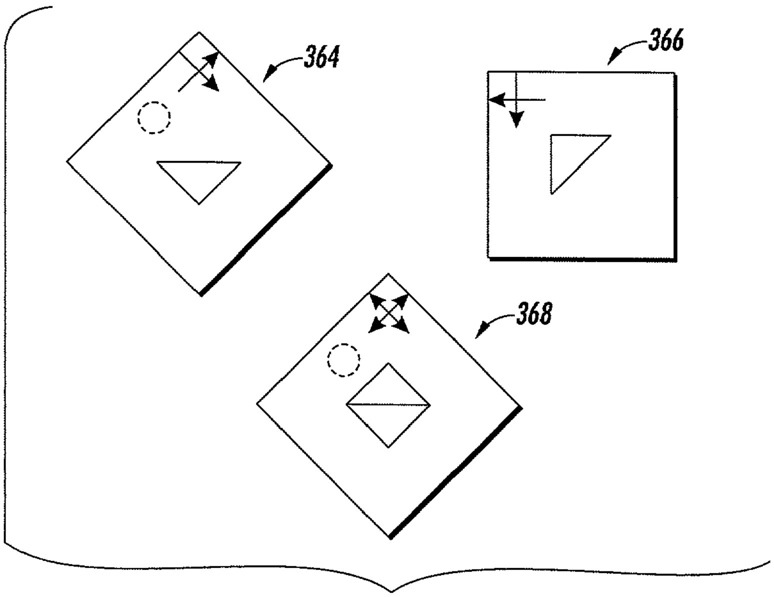
FIG. 8 is a diagram illustrating the superimposition of embedded information consistent with the principles of the invention.

FIG. 8 is a diagram illustrating the process of decoding and displaying information consistent with the principles of the invention. As shown in FIG. 8, substrate 364 has embedded code embodied thereon (shown as light gray background), and may have images, such as a triangle and crosshair arrow. The embedded code embodies a code system from which additional content from substrate 364 can be determined. In FIG. 8, the embedded code may represent image information 366 in the form of a second triangle and crosshair arrow. An image capture device captures a portion of substrate 364, to thereby capture an image of a portion of the embedded code embodied thereon. The embedded code is decoded to determine its human-sensible contents, and the orientation of substrate 364, represented by the crosshair arrow on substrate 364. The decoded code is used to construct image information 366. The content and orientation information decoded from the embedded code on substrate 364 are then used to visually superimpose image information 366 on substrate 364 to form a composite image 368. Instead of superimposing image information 366 on substrate 364, the embedded code may alternatively be displayed separately from the image of substrate 364.

Since image information 366 is in machine-readable form, a human being cannot easily decipher it. However, anyone with the appropriate decoder may decode the encoded information. To further enhance security, two cryptographic techniques may be deployed. First, all or part of data substrate 364 may be encrypted. To decrypt the data, an appropriate cryptographic key is required, thus restricting information access to authorized parties (e.g. a clerk). Second, all or part of data substrate 364 may be digitally signed. The digital signature provides cryptographic assurance that data substrate 364 has not been altered, and was produced by an authorized key holder (e.g. a bank). Cryptographic techniques, including public key cryptography (PKC) as disclosed in U.S. Pat. No 4,405,829 (which is hereby incorporated by reference), are commonly known by those skilled in the art.

Figure 9:
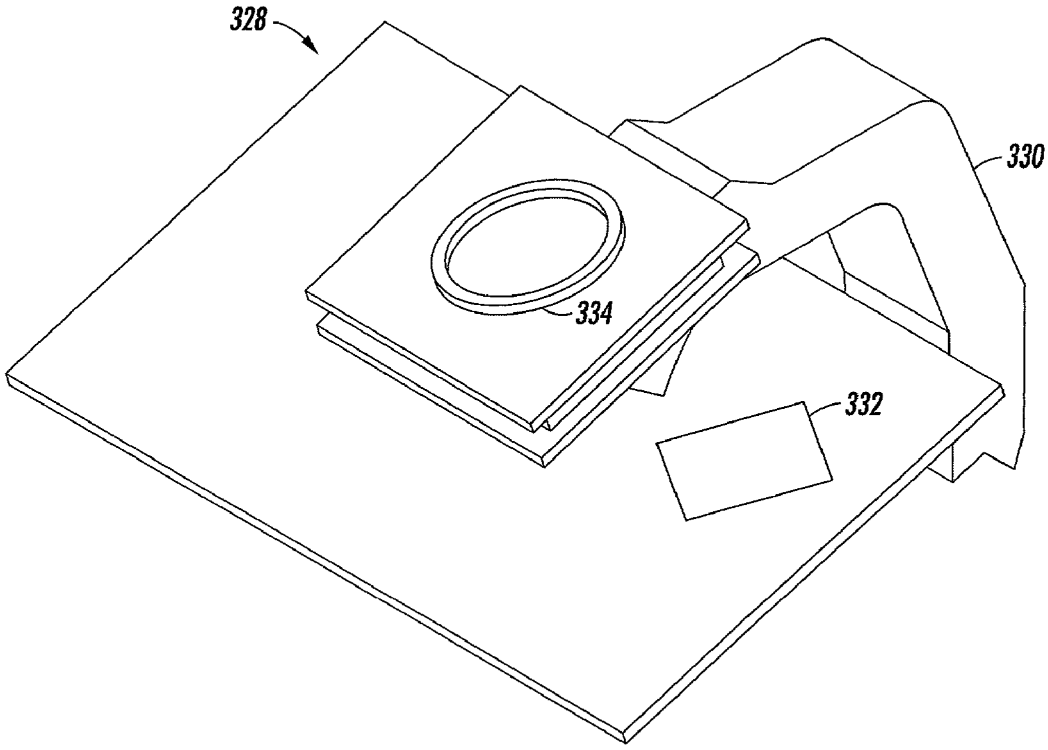
FIG. 9 is a block diagram illustrating one embodiment of a lens apparatus consistent with the principles of the invention.

FIG. 9 is a block diagram illustrating an embodiment of a lens apparatus consistent with the principles of the invention. Lens apparatus 328 is comprised of lens viewport 334, which is supported by support arm 330. A viewer looking down through lens viewport 334 observes substrate 332, which has embedded code embodied thereon. A camera (not shown) captures an image of substrate 332. The image is sent to a computer (not shown), which decodes the embedded code on substrate 332 appearing under lens viewport 334, the orientation of substrate 332 under lens viewport 334, and the label code, if any, in the embedded code on substrate 332. Based on the label, x,y location and orientation of substrate 332, the computer generates overlay image information which is displayed in lens viewport 334 in such a way that the generated image information represents human-sensible text, patterns or symbols.

Figure 10:
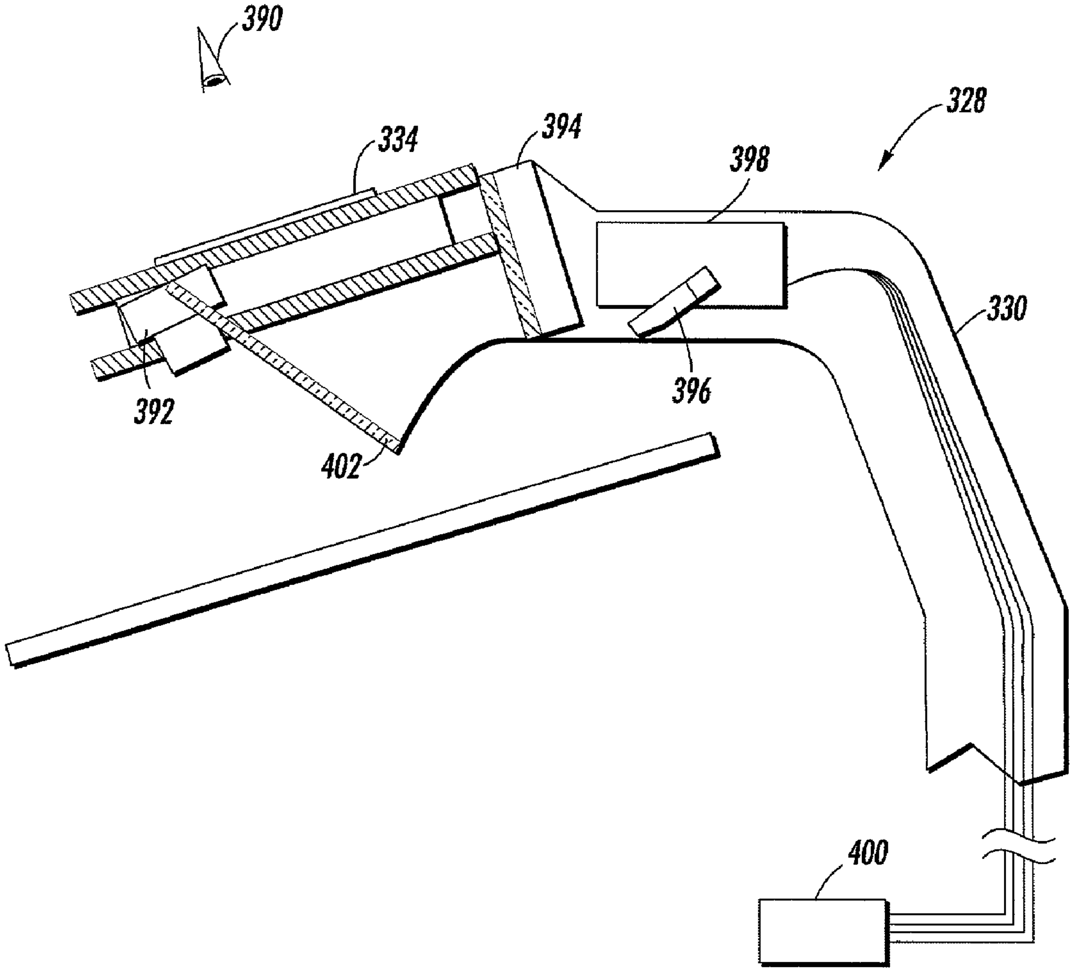
FIG. 10 is a cutaway side view of the lens apparatus shown in FIG. 9.

FIG. 10 is a cutaway side view of the lens apparatus shown in FIG. 9. Lens apparatus 328 further comprises camera 392, display 394, lamp 396, display controller 398, computer 400 and semitransparent mirror 402. Lamp 396 illuminates substrate 332 (not shown). Camera 392, which corresponds to image capture devices 70 and 80 illustrated in FIG. 6 and FIG. 7, respectively, captures an image of the substrate, and transmits the image to computer 400. Computer 400 performs the function of decoders 72 and 82 illustrated in FIG. 6 and FIG. 7, respectively. Computer 400, in combination with display controller 398 and display 394, performs a function most similar to image generator 84 illustrated in FIG. 7 because the generated image is reflected off semitransparent mirror 402.

Computer 400 decodes the embedded data in the captured image to construct human-sensible image information (e.g., a payor's scripted signature) representative of the embedded code. Computer 400 may also decode the embedded data in the captured image to determine the orientation of substrate 332 under lens viewport 334, and the label code, if any, in the embedded code of the captured image. From this information, computer 400 generates the overlay image information, which is sent to display controller 398. Display controller 398 sends the overlay image information to display 394. Display 394 generates an overlay image based on the overlay image information from display controller 398. Observer 390 looking through viewport 334 sees substrate 332 through semitransparent mirror 402 overlaid with the overlay image information generated by image generator 394.

Figure 11A:
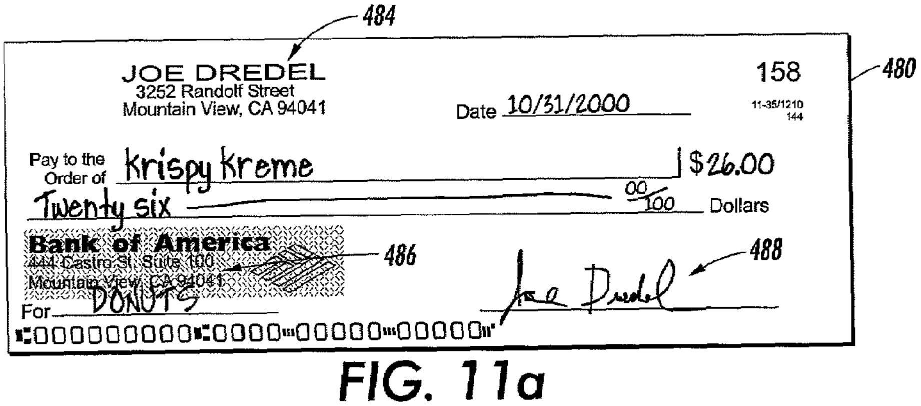
FIG. 11 illustrates an example of a substrate, an overlay image, and the substrate overlaid with the overlay image as seen through the lens viewport illustrated in FIG. 9 and FIG. 10.
Figure 11B:
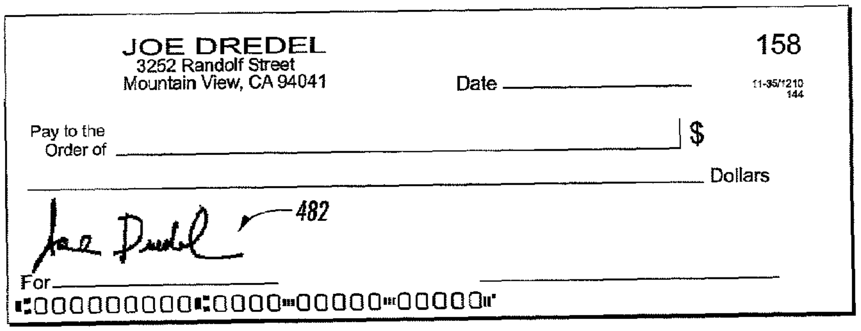
Figure 11C:
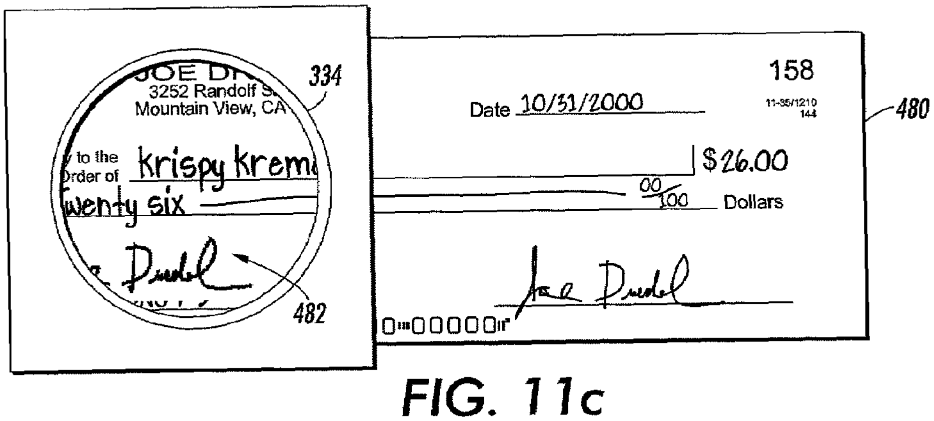

FIG. 11 illustrates an example of a substrate 480 (FIG. 11*a*), an overlay image (FIG. 11*b*), and the substrate overlaid with the overlay image (FIG. 11*c*) as seen through the lens viewport illustrated in FIG. 9 and FIG. 10. Substrate 480 (a glyphcheck) as shown in FIG. 11*c* appears to be identical to a prior art third-party check. It is only after substrate 480 is viewed through the lens viewport, that its true character as a glyphcheck with embedded data is revealed. The substrate 480 is comprised of a completed third-party check drawn on a payor's account and embedded data. In this case, substrate 480 is comprised of at least a payor identification 484, bank address 486, and payor signature 488. In one embodiment, either or both sides of substrate 480 are covered entirely with embedded data. Substrate 480 may alternatively be comprised of one or more small areas of embedded data. For example, the background, the text, or both may be comprised of embedded data, or all three may be comprised of embedded data. Similarly, portions of the background of substrate 480 (e.g., the portion behind bank address 486 or the portion behind the payor address 484) may comprise embedded data. Embedded data may also be appended to substrate 480 though the use of an adhesive sticker.

Figure 12:
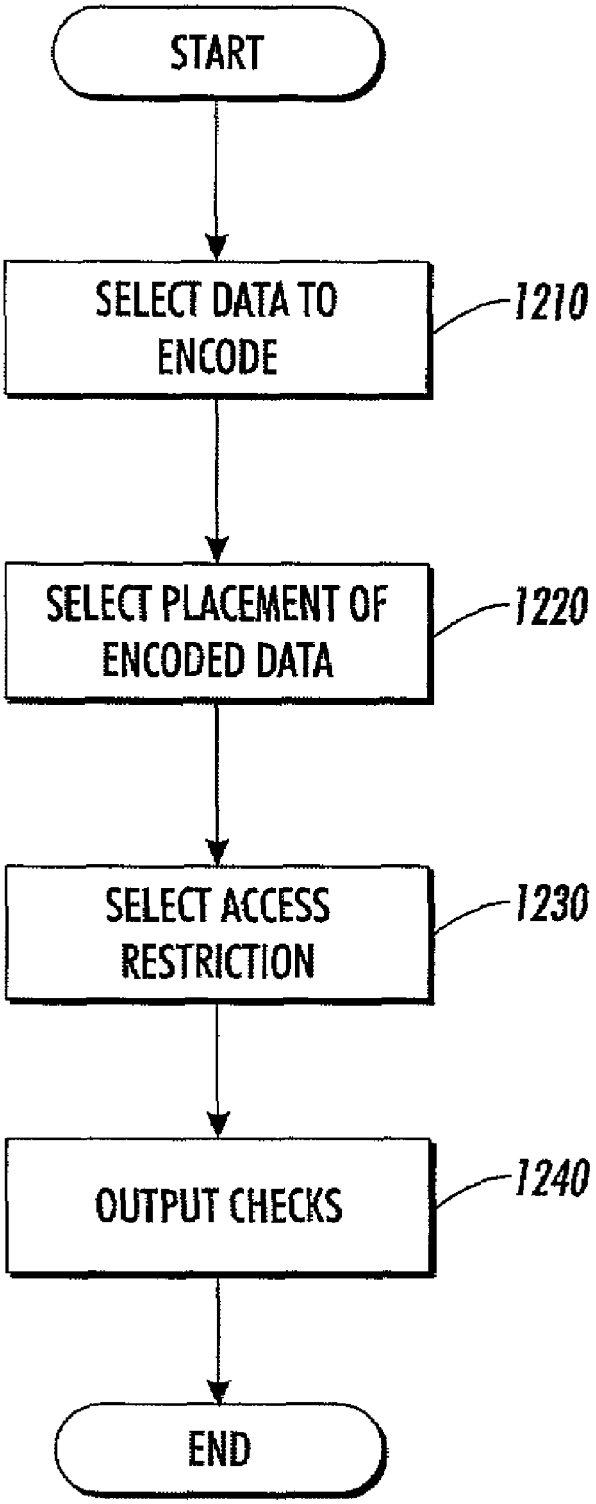
FIG. 12 is a detailed flow diagram of the process for creating a glyphcheck in accordance with one embodiment of the present invention.

Referring now to FIG. 12, there is shown a process for creating a third-party check in accordance with the present invention will now be described. The process begins in step 1210 when a user (or payor) selects the data to encode. The user may encode all or a portion of the data included on the front of a third-party check. More specifically, the user may encode: payor's signature, payee, amount, date, MICR line and memo. For handwritten checks, the user may encode a computer graphic of the user's signature or information validating the MICR line. For computer-generated checks, the user may additionally choose to encode information validating the payee, payor, amount, date and memo. If the user decides to only encode the payor's signature, processing may immediately flow to step 1230 where the system allows the user to select the access restrictions and then output one or more pre-printed glyphchecks (explained below). It is important to note that if the user elects to encode information in addition to the payor's signature, the encoded data will vary from one check to the next.

Once the user selects the data to encode, processing flows to step 1220, where the user selects the placement of the encoded data. As previously stated, the encoded data may be limited to one or more portions of the check, or it may be printed on the entire check. For example, the user may limit the location of the encoded data to the front of the check, the back of the check, or to one or more predefined locations on either the front or back. Given the nature of glyphs and glyphtones (including the capability of using color) it is possible to print everything, including pictures and text using glyphs. However, the user or the bank holding the account may wish to limit the location of the embedded data. Consequently, the system gives the user the opportunity to select the placement of the encoded data.

Once the user selects the placement location for the embedded data, processing flows to step 1230 where the user is given an opportunity to select the level of access to the data. In other words, the user may tightly limit access to the data, or the user may provide unfettered access to the unencrypted data. More specifically, cryptography maybe used to assure the integrity of the data encoded in the check, and/or provide access controls to the encoded information. The computer graphic of the payor's signature may be encrypted, such that only holders of the appropriate cryptographic key will be able to view it. The encoded information may also be digitally signed, such that its integrity may be cryptographically inspected. It is important to note that a digital signature can be encoded, even if the information signed is not encoded. For example, the user may encode the digital signature of the MICR line, but not the MICR line itself. The MICR line may be read directly off the check during verification, and compared with the encoded digital signature. The information being digitally signed may also be concatenated such that a single digital signature may be used to validate its integrity.

Once the user selects the data access limits, processing flows to step 1240 where the system prints one or more checks for use by the payor. After the check is printed, the payor may use the check as desired. For handwritten checks, the payor may manually write information on the face of the check, even at the risk of possibly overwriting the embedded information. Glyph codes, as known by those skilled in the art, are capable of being decoded even though some of the marks may be occluded, or not readable.

To retrieve the embedded code from substrate 480, a user first places substrate 480 under lens viewport 334 and camera 392 captures the image appearing under lens viewport 334 and transmits the image to computer 400. Computer 400 (as shown in FIG. 10) decodes the embedded data in the captured image from substrate 480 to construct the human-sensible image information representative of the embedded code on substrate appearing under lens viewport 334. Computer 400 may also decode the embedded data in the captured image to determine the orientation of substrate 480 under lens viewport 334, and the label code, if any, in the embedded code of the captured image.

From this information, computer 400 generates overlay image information 482, which is sent to display controller 398. Display controller 398 sends overlay image information 482 to display 394. Display 394 generates overlay image information 482, which is reflected off semitransparent mirror 402 through lens viewport 334. Observer 390 looking through viewport 334 sees substrate 332 through semitransparent mirror 402 overlaid with overlay image information 482 generated by image generator 394. In FIG. 11*c*, the overlay image information 482 is a scripted signature overlaid on the third-party check. A financial clerk comparing the two signatures can now determine, without accessing any external databases or manual data stores, whether the signature written on the check is authentic.

Figure 13:
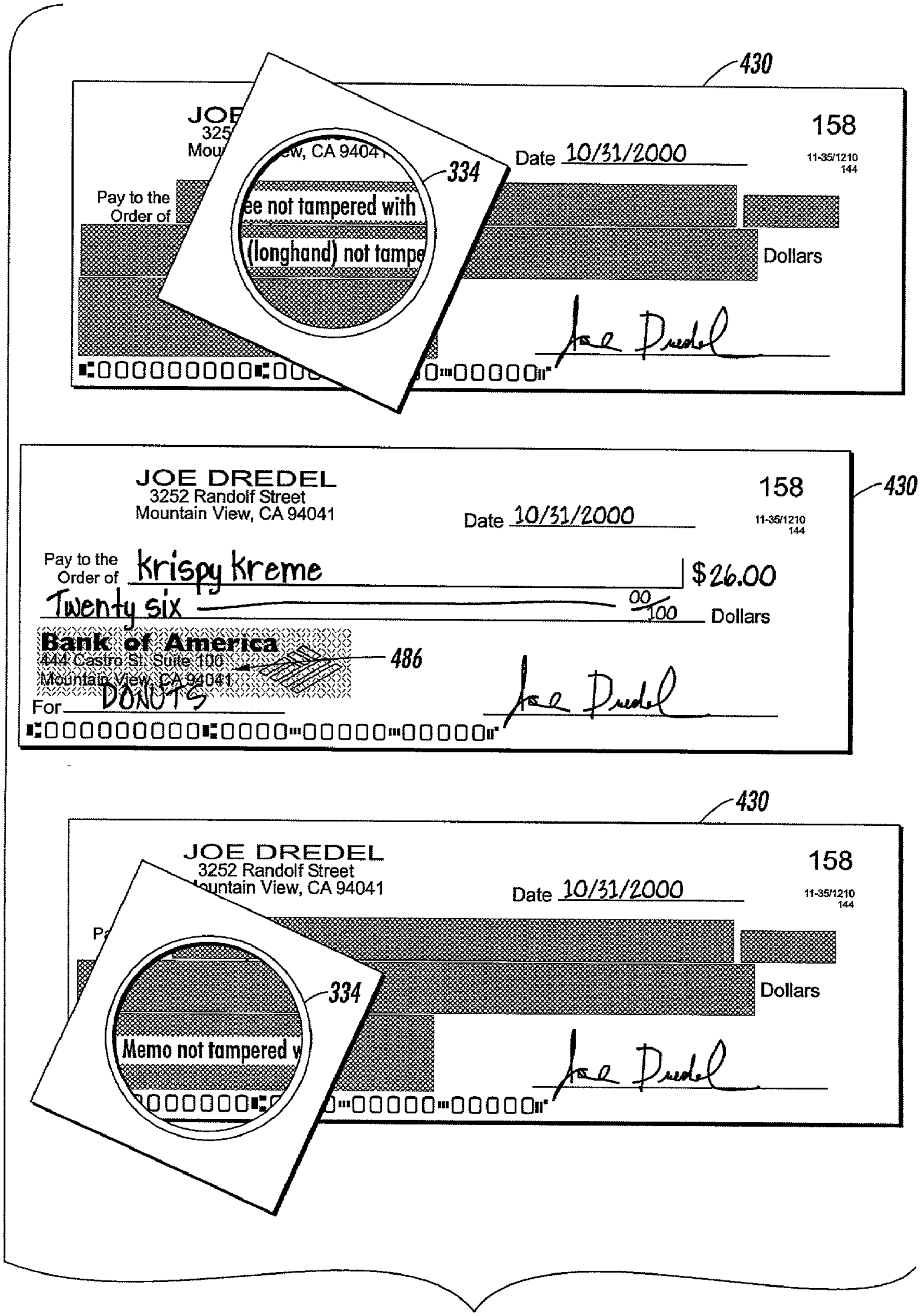
FIG. 13 illustrates another example of a substrate, an overlay image, and the substrate overlaid with the overlay image as seen through the lens viewport illustrated in FIG. 9 and FIG. 10.

FIG. 13 illustrates another example of a substrate, an overlay image, and the substrate overlaid with the overlay image as seen through the lens viewport illustrated in FIG. 9 and FIG. 10. More particularly, FIG. 13 illustrates how the system may respond when the user moves substrate 430 under lens viewport 334. In this example, substrate 430 comprises a third-party check made out to "Krispy Kreme" for "twenty-six" dollars. The memo indicates that the check is for "Donuts". Substrate 430 also includes embedded data embodied thereon (not shown). In this embodiment, it is envisioned that the payor has encoded information on the payee, amount, memo, and signature when the check was created. When the user (e.g., bank teller) moves substrate 430 so that the payee (i.e., "Pay to the Order of") is under lens viewport 334, camera 400 captures an image of the substrate area under lens viewport 334. Computer 400 decodes the embedded data in the captured image from substrate 430 and compares the decoded data with the handwritten data on the surface of the third-party check. When computer 400 determines that the two terms are identical, it generates overlay information "Payee not tampered with," sends the information to display controller 398, and the information is reflected off semitransparent mirror 402. A user looking through lens viewport 334 sees the payee information overlaid with overlay image information "Payee not tampered with," as illustrated in the upper right of FIG. 13. When the user moves substrate 430 so that the memo appears under lens viewport 334, camera 392 captures an image of the new area under lens viewport 334. Computer 400 decodes the embedded data in the captured image from substrate 430 and compares the decoded data with the handwritten data on the surface of the third-party check. When computer 400 determines that the two terms are identical, it generates overlay information "Memo not tampered with," sends the information to display controller 398, and the information is reflected off semitransparent mirror 402. A user looking through lens viewport 334 sees the memo information overlaid with overlay image information "Memo not tampered with," as illustrated in the lower right of 14. Thus, as the user moves substrate 430, the overlay image information is dynamically modified to appear in lens viewport 334.

Superimposing the overlay image with the substrate requires a precise determination of the orientation of the substrate with respect to the image capture device. To determine the orientation angle of the substrate relative to the image capture device, computer 400 resolves the angle between 0° and 360°. Orientation determination routines are commonly known by those skilled in the art. Therefore, an explanation of them will not be repeated here for the sake of brevity.

Computer 400 decodes address information encoded in the glyphs by analyzing the captured image area in two steps. Ideally, in the systems shown and described with respect to FIG. 6, FIGS. 7 and 10, image capture devices 70, 80, and 392, respectively, capture an area of a substrate that is angularly aligned as shown in the pattern of bits shown in 22. In reality, however, the substrate and image capture device may not be aligned to one another. Thus, the relative angle between the two could be oriented anywhere from 0° to 359°. Therefore, computer 400 must first determine the orientation of the image as part of decoding and interpreting the address information.

In the previous description, operation of the present system was described as if manual operations were performed by a human operator. It must be understood that no such involvement of a human operator is necessary or even desirable in the present invention. The operations described herein are machine operations that may alternatively be performed in conjunction with a human operator or user who interacts with the computer. The machines used for performing the operation of the present invention include general-purpose digital computers or other similar computing devices.

The orientation of the image is determined by analyzing the captured image. This process is called disambiguation. One method of disambiguation is described in U.S. patent application Ser. No. 09/454,526, now U.S, Pat. No. 6,880,755, entitled METHOD AND APPARATUS FOR DISPLAY OF SPATIALLY REGISTERED INFORMATION USING EMBEDDED DATA which is hereby incorporated by reference and which is related to U.S. patent application No. 09/455,304, now U.S. Pat. No. 6,678,425, entitled METHOD AND APPARATUS FOR DECODING ANGULAR ORIENTATION OF LATTICE CODES, both filed Dec. 6, 1999.

A disambiguation processes consistent with the present invention will now be described in greater detail using teachings from U.S. Pat. No. 6,880,755 that was incorporated by reference.

FIG. 17 of '755 is a flowchart teaching a method to create a composite lattice image pattern for use in determining a quadrant offset angle. The method first selects a seed pixel from the captured image and finds a local minimum in the vicinity of the seed pixel indicating the presence of a glyph. Next the method finds the centroid of this glyph. The method then selects the next seed pixel for analysis at a particular x and y interval from the previously analyzed seed pixel. The particular x and y interval is based on the height and width of the composite lattice image pattern. Next, using the glyph centroid as the origin, the method adds a subsample of the captured image to the composite lattice image pattern. From the resulting composite lattice image pattern the method determines the quadrant offset angle.

FIG. 18 of '755 is a flowchart the illustrates a method used to determine a quadrant offset angle using a composite lattice image pattern generated in accordance with the flowchart of FIG. 17 of '755. The method first finds the darkest pixel along an arc between zero and 90 degrees at a distance from the origin equal to the glyph pitch, the distance between adjacent glyphs on the lattice of glyphs, and then finds the centroid of the shape containing this pixel. Once the centroid is found, the method estimates the approximate location of the next minimum along the lattice axis based on the centroid position and the glyph pitch based on the assumption that the lattice axis passes through the centroid and the origin. Using this estimate, the method finds the local minimum around the estimated location, and finds the centroid of the shape containing that minimum. If the last possible minimum has been found, the method fits a straight line, referred to as the axis line, from the origin through the centroids and determines the angle of the axis line, between 0° and 90° and this angle is then offset to fall between −45 degrees and +45 degrees by subtracting 45°.

FIG. 23 and FIG. 24 of '755 form a flow chart showing exemplary disambiguation and address decoding processes performed by a computer on the captured image area. The disambiguation process starts by image processing the captured portion of the address carpet to determine the glyph lattice. The glyphs are then decoded as 1's or 0's, which are filled into a binary data matrix having rows and columns corresponding to the glyph lattice rows. The orientation may still be ambiguous with respect to 90° and 180° rotations.

FIG. 25 of '755 illustrates a binary data matrix (BDM) 2310 formed from a glyph lattice. Locations in the BDM correspond to locations in the glyph lattice. Each location of the glyph lattice is analyzed to determine which value should be placed in the corresponding location of the BDM. Initially, the BDM is filled with a value, for example ϕ, which indicates that no attempt has been made to read the glyph. Once the glyph corresponding to a particular location has been analyzed, ϕ is replaced by a value indicating the result of the glyph analysis.

In FIG. 25 of '755, a B indicates a border location, an X indicates that no interpretable glyph was found at the corresponding location of the glyph lattice, an E indicates a glyph at the edge of the captured image portion, a 0 indicates a back slash glyph, a 1 indicates a forward slash glyph, and d indicates a label code. The area of the matrix corresponding to the captured image is filled with 0's and 1's, the edge is bounded by E's, and the X's correspond to locations that have no readable glyphs.

The image capture device might be oriented relative to the substrate at any angle. Therefore, the captured image could be oriented at any angle. Thus, even though a BDM of 0's and 1's is derived from the captured image, it is uncertain whether the BDM is oriented at 0 (i.e., correctly oriented), 90°, 180°, or 270° relative to the original code pattern in the glyph address carpet from which the image was captured. The orientation can be uniquely determined directly from the address codes.

After the image has been converted to a BDM, it is processed. The original BDM developed from the captured image is referred to as BDM1. BDM1 is copied and the copy rotated clockwise 90° to form a second binary data matrix, BDM2. By rotating BDM1 by 90°, the rows of BDM1 become the columns of BDM2, and the columns of BDM1 become the rows of BDM2. Additionally, all bit values in BDM2 are flipped from 0 to 1, and 1 to 0.

A correlation is separately performed on the odd and even rows of BDM1 to determine whether code in the rows are staggered forward or backward. The correlation is also performed for the odd and even rows of BDM2. The correlation is performed over all the rows of each BDM, and results in correlation value C1 for BDM1 and correlation value C2 for BDM2.

FIG. 26 of '755 is a flowchart showing an embodiment of correlation steps 2216 and 2218 of FIG. 24 of '755. The process determines a correlation value for every other line of a BDM along diagonals in each direction, and sums the row correlation values to form a final correlation value for the odd or even rows. The process is performed on the odd rows of BDM1 to form correlation value C1ODD for BDM1, the even rows of BDM1 to form correlation value C1EVEN for BDM1, the odd rows of BDM2 to form correlation value C2ODD for BDM2, the even rows of BDM2 to form correlation value C2EVEN for BDM2. The BDM that is oriented at 0° or 180° will have a larger CODD+CEVEN than the other BDM. After the process has correlated each adjacent row, the correlation value C_RIGHT indicates the strength of the correlation along the diagonals to the right. Similar processing is performed on diagonals running from the upper right to lower left to develop correlation value C_LEFT. After correlating the right and left diagonals to determine C_RIGHT and C_LEFT, a final correlation value C is determined by subtracting C_LEFT from C_RIGHT. For example, if odd rows for BDM1 are processed, the C value becomes C1ODD for BDM1. In addition, correlations are performed for the odd and even rows of BDM1 and the odd and even rows of BDM2. From this information, the correlation value C1 for BDM1 is set to C1EVEN+C1ODD, and the correlation value C2 for BDM2 is set to C2EVEN+C2ODD.

For each BDM, four correlation values are developed: 1) odd rows, right to left, 2) odd rows, left to right, 3) even rows, right to left and 4) even rows, left to right. From these correlation values, the strongest correlation value for the even rows, and strongest correlation value for the odd rows is chosen, and these become CEVEN and CODD for that BDM (steps 2216 of '755 and 2218 of '755). CEVEN and CODD are then added to form a final C correlation value for that BDM. The BDM with the strongest correlation value is the BDM that is oriented at either 0° or 180° because of the relative orientation of the codes in the odd and even rows. Thus, two aspects of the chosen BDM are now established: which direction every other line of codes is staggered, and that the BDM is oriented horizontally, at either 0° or 180°. Another correlation process, at step 2230 of '755 is performed to determine which direction the code in each line runs (as opposed to which way the code is staggered).

The codes in the odd lines are staggered in one direction, and the codes in the even lines are staggered in the other. This staggering property of the code, in conjunction with knowing the respective codes that run in the odd lines and even lines, allows determination of the proper 0° orientation of the BDM.

Note that if C1 is greater than C2, then BDM1 is selected for further processing. C1 being greater than C2 indicates that the one-dimensional codes of BDM1 are most strongly correlated and are, therefore, oriented at either 0° or 180°. If C2 is greater than C1, then BDM2 is selected for further processing, because the higher correlation indicates that BDM2 is oriented at either 0° or 180°. Thus, the correct BDM has been found. However, it still must be determined whether the selected BDM is at 0° (i.e., oriented correctly), or rotated by 180°.

FIG. 24 of '755 is a flowchart showing the steps to determine the address of the captured area of the glyph carpet. Preferably, bit positions along a diagonal in the BDM, when the BDM is oriented at 0°, have the same value at every other row. This results in a first code sequence for the odd rows and a second code sequence for the even rows.

Expected codes (pseudo noise) for rows staggered forward and for rows staggered backward are cross correlated with the BDM to establish the best match of the glyph sequence with pseudo noise sequence for the odd and even rows. The four correlations develop four pairs of peak correlation and position values that disambiguates the rotation of the BDM.

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. An apparatus for creating a tamper-proof document, comprising:

an encoder configured to digitally encode a user-inputted portion of the document as encoded information;

a placement selector configured to select a location on the tamper-proof document to place the encoded information;

an access selector configured to select a level of access for the encoded information;

a processor configured to process, responsive to said access selector, the encoded information;

a printer configured to print the tamper-proof document including the encoded information as a lattice image pattern area of glyph marks at the location;

a disambiguation unit configured to determine an angular orientation of the lattice image pattern, the disambiguation unit comprising:

a compositing mechanism configured to composite a subsample of the glyph marks in said lattice image pattern to a composite lattice image pattern; and a lattice-axis determination mechanism configured to determine a lattice axis for said lattice image pattern from a line fit through centroids of some of a plurality of composite glyphs in the composite lattice image pattern formed by the compositing mechanism; and a lens apparatus configured to produce a composite image of the document and image information decoded from the encoded information wherein the orientation of the image information responsive to the disambiguation unit.

2. The apparatus of claim 1, wherein the tamper-proof document is a third-party check.

3. A method for creating a tamper-proof document, comprising:

digitally encoding a user-inputted portion of the document as encoded information;

selecting a location on the tamper-proof document to place the encoded information;

selecting a level of access for the encoded information;

processing, responsive to selecting the level of access, the encoded information;

printing the tamper-proof document including the encoded information as a lattice image pattern of glyph marks at the location;

determining an angular orientation of the lattice image pattern, the determining further comprising:

forming a composite lattice image pattern having a plurality of composite glyph marks; and determining a lattice axis for the lattice image pattern from a line fit through centroids of some of the plurality of composite glyph marks in the composite lattice image pattern; and displaying a composite image of the document and image information decoded from the encoded information wherein the orientation of the image information is responsive to the lattice axis.

4. The method of claim 3, wherein the tamper-proof document is a third-party check.

5. The method of claim 3, wherein the user-inputted portion is handwritten.

6. A method for ensuring that a document has not been altered, comprising:

digitally encoding a user-inputted portion of the document as encoded information;

selecting a location on the tamper-proof document to place the encoded information;

selecting a level of access for the encoded information;

processing, responsive to selecting the level of access, the encoded information;

printing the tamper-proof document including the encoded information as an area of glyph marks at the location;

decoding the encoded information as decoded information;

determining an angular orientation of a lattice image pattern, the determining further comprising:

forming a composite lattice image pattern having a plurality of composite glyph marks; and determining a lattice axis for the lattice image pattern from a line fit through centroids of some of the plurality of composite glyph marks in the composite lattice image pattern;

displaying the decoded information as a composite image of the document and the decoded information wherein the orientation of the decoded information is responsive to the lattice axis;

comparing the decoded information with the user-inputted portion; and identifying the document as altered, when the decoded information is not identical to the user-inputted portion.

7. The method of claim 6, wherein the user-inputted portion is handwritten.

8. The method of claim 6, wherein the decoded information is a graphical recreation of the user-inputted portion.

9. The method of claim 6, wherein the decoding step further comprises placing the document under a viewport of a lens apparatus, wherein the lens apparatus converts the encoded information to decoded information.

10. The method of claim 9, wherein displaying the decoded information further comprises superimposing the decoded information on the document.

11. The method of claim 9, wherein displaying the decoded information further comprises displaying the decoded information outside of the document.

12. A computer-readable medium containing instructions for controlling a data processing system to perform a method for creating a tamper-proof document, the data processing system when executing the instructions performing the method comprising;

digitally encoding a user-inputted portion of the document as encoded information;

selecting a location on the tamper-proof document to place the encoded information;

selecting a level of access for the encoded information;

processing, responsive to selecting the level of access, the encoded information;

printing the tamper-proof document including the encoded information as a lattice image pattern of glyph marks at the location;

determining an angular orientation of the lattice image pattern, the determining further comprising:

forming a composite lattice image pattern having a plurality of composite glyph marks; and determining a lattice axis for the lattice image pattern from a line fit through centroids of some of the plurality of composite glyph marks in the composite lattice image pattern; and displaying a composite image of the document and image information decoded from the encoded information wherein the orientation of the image information is responsive to the lattice axis.

13. The computer-readable medium of claim 12, wherein the user-inputted portion is handwritten.

14. The computer-readable medium of claim 12, wherein the tamper-proof document is a third-party check.

* * * * *